(12) United States Patent
Fujinami et al.

(10) Patent No.: US 11,942,110 B2
(45) Date of Patent: Mar. 26, 2024

(54) MAGNETIC DISK DEVICE AND COMMAND PROCESSING METHOD

(71) Applicants: Kabushiki Kaisha Toshiba, Tokyo (JP); Toshiba Electronic Devices & Storage Corporation, Tokyo (JP)

(72) Inventors: Takashi Fujinami, Fujisawa Kanagawa (JP); Noriyuki Satou, Kamakura Kanagawa (JP); Takashi Onoda, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/119,749

(22) Filed: Mar. 9, 2023

(65) Prior Publication Data

US 2024/0071420 A1 Feb. 29, 2024

(30) Foreign Application Priority Data

Aug. 31, 2022 (JP) ................. 2022-138628

(51) Int. Cl.
*G11B 5/55* (2006.01)
*G11B 19/02* (2006.01)
(52) U.S. Cl.
CPC .................. *G11B 19/02* (2013.01)
(58) Field of Classification Search
CPC ..... G11B 21/083; G11B 5/012; G11B 5/5547; G11B 5/5534; G11B 5/6017; G11B 5/6023; G11B 5/6076; G11B 20/10222; G11B 5/00; G11B 5/09; G11B 20/10; G06F 3/061; G06F 3/0659; G06F 3/0676
USPC ....................................... 360/78.04
See application file for complete search history.

(56) References Cited

U.S. PATENT DOCUMENTS

| | | | |
|---|---|---|---|
| 6,721,906 B1 | 4/2004 | Hirashita et al. | |
| 9,239,786 B2 | 1/2016 | Ki et al. | |
| 10,198,188 B2 * | 2/2019 | Hara | G06F 3/061 |
| 10,250,684 B2 | 4/2019 | Dimnaku et al. | |
| 10,732,895 B2 | 8/2020 | Earhart et al. | |
| 2003/0225969 A1 | 12/2003 | Uchida et al. | |
| 2006/0106980 A1 | 5/2006 | Kobayashi et al. | |
| 2015/0242131 A1 | 8/2015 | Nakamura et al. | |

FOREIGN PATENT DOCUMENTS

| | | |
|---|---|---|
| JP | 2001-100935 A | 4/2001 |
| JP | 2003-308176 A | 10/2003 |
| JP | 2004-272969 A | 9/2004 |

(Continued)

*Primary Examiner* — Nabil Z Hindi
(74) *Attorney, Agent, or Firm* — Allen & Overy LLP

(57) ABSTRACT

According to one embodiment, a magnetic disk device includes a disk, a head, a command queue, a command residence time calculation unit calculating a residence time of each of commands in the command queue, a command information calculation unit calculating the number of the commands and a ratio, a limit time determination unit obtaining a latency limit time corresponding to the number of commands and the ratio, from a latency limit time determination table, and a command selection processing unit selecting a command to be executed, by considering the latency limit time.

11 Claims, 13 Drawing Sheets

(56) References Cited

FOREIGN PATENT DOCUMENTS

| JP | 2006-139548 A | 6/2006 |
|---|---|---|
| JP | 3793682 B2 | 7/2006 |
| JP | 6244972 B2 | 12/2017 |

* cited by examiner

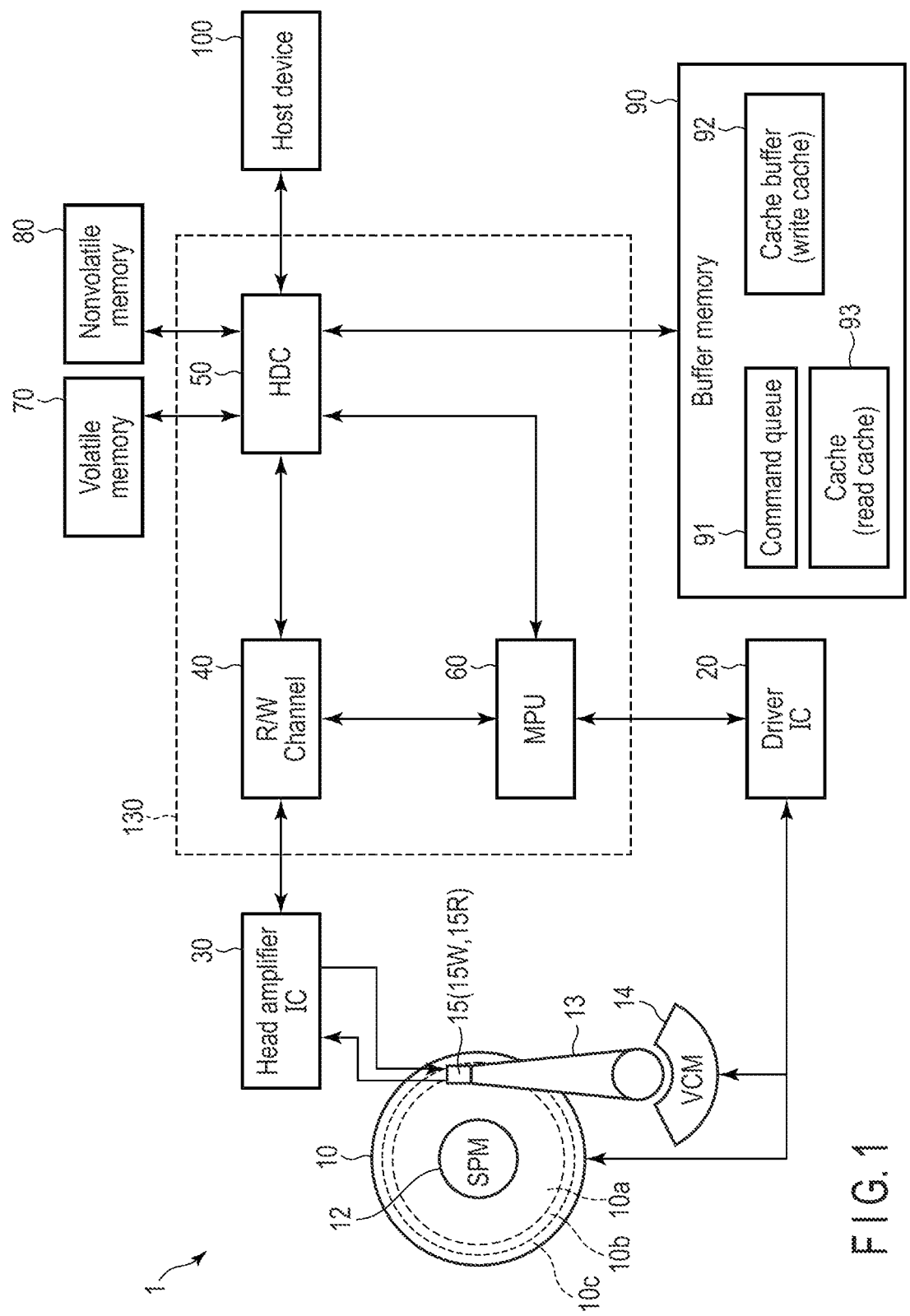
F I G. 1

| First latency limit time determination table | | | | | | | | | | | | |
|---|---|---|---|---|---|---|---|---|---|---|---|---|
| | | R/W rate | | | | | | | | | | |
| | | 0% | 10% | 20% | 30% | 40% | 50% | 60% | 70% | 80% | 90% | 100% |
| Number of commands in command queue | 1 | 200 | 200 | 200 | 200 | 200 | 200 | 200 | 200 | 200 | 200 | 200 |
| | 2 | 200 | 200 | 200 | 300 | 300 | 300 | 300 | 300 | 300 | 300 | 200 |
| | 4 | 300 | 300 | 300 | 300 | 300 | 300 | 300 | 300 | 300 | 300 | 250 |
| | 8 | 350 | 350 | 350 | 350 | 350 | 400 | 400 | 400 | 450 | 450 | 300 |
| | 16 | 600 | 600 | 600 | 600 | 600 | 700 | 700 | 700 | 800 | 800 | 600 |
| | 32 | 1000 | 1000 | 1000 | 1000 | 1000 | 1100 | 1100 | 1100 | 1200 | 1200 | 900 |
| | 64 | 1500 | 1500 | 1500 | 1500 | 1500 | 1600 | 1600 | 1600 | 1700 | 1700 | 1400 |
| | 128 | 2000 | 2000 | 2000 | 2000 | 2000 | 2100 | 2100 | 2200 | 2200 | 2200 | 2000 |

FIG. 7

| Second latency limit time determination table | | | | | | | | | | | | |
|---|---|---|---|---|---|---|---|---|---|---|---|---|
| | | R/W rate | | | | | | | | | | |
| | | 0% | 10% | 20% | 30% | 40% | 50% | 60% | 70% | 80% | 90% | 100% |
| Number of commands in command queue | 1 | 50 | 50 | 50 | 50 | 50 | 50 | 50 | 50 | 50 | 50 | 50 |
| | 2 | 100 | 100 | 100 | 150 | 150 | 150 | 150 | 150 | 150 | 150 | 100 |
| | 4 | 150 | 150 | 150 | 150 | 150 | 200 | 200 | 200 | 200 | 200 | 150 |
| | 8 | 250 | 250 | 250 | 250 | 250 | 300 | 300 | 300 | 350 | 350 | 200 |
| | 16 | 300 | 300 | 400 | 400 | 450 | 500 | 500 | 500 | 600 | 600 | 400 |
| | 32 | 500 | 500 | 500 | 500 | 500 | 700 | 700 | 700 | 700 | 800 | 700 |
| | 64 | 800 | 800 | 800 | 800 | 800 | 900 | 900 | 900 | 900 | 1000 | 900 |
| | 128 | 1500 | 1500 | 1500 | 1500 | 1800 | 1800 | 1800 | 1800 | 1800 | 1900 | 1500 |

FIG. 8

| Third latency limit time determination table | | | | | | | | | | | | |
|---|---|---|---|---|---|---|---|---|---|---|---|---|
| | | R/W rate | | | | | | | | | | |
| | | 0% | 10% | 20% | 30% | 40% | 50% | 60% | 70% | 80% | 90% | 100% |
| Number of commands in command queue | 1 | 200 | 200 | 200 | 200 | 200 | 200 | 200 | 200 | 200 | 200 | 200 |
| | 2 | 300 | 300 | 300 | 300 | 300 | 300 | 300 | 300 | 300 | 300 | 200 |
| | 4 | 300 | 300 | 300 | 300 | 300 | 300 | 300 | 300 | 300 | 300 | 250 |
| | 8 | 400 | 400 | 400 | 400 | 400 | 500 | 500 | 500 | 550 | 550 | 400 |
| | 16 | 700 | 700 | 700 | 700 | 700 | 800 | 800 | 800 | 900 | 900 | 700 |
| | 32 | 1300 | 1300 | 1300 | 1300 | 1300 | 1400 | 1400 | 1400 | 1500 | 1500 | 1300 |
| | 64 | 1700 | 1700 | 1700 | 1700 | 1700 | 1800 | 1800 | 1800 | 1900 | 1900 | 1700 |
| | 128 | 2100 | 2100 | 2100 | 2100 | 2200 | 2200 | 2200 | 2300 | 2300 | 2300 | 2100 |

FIG. 9

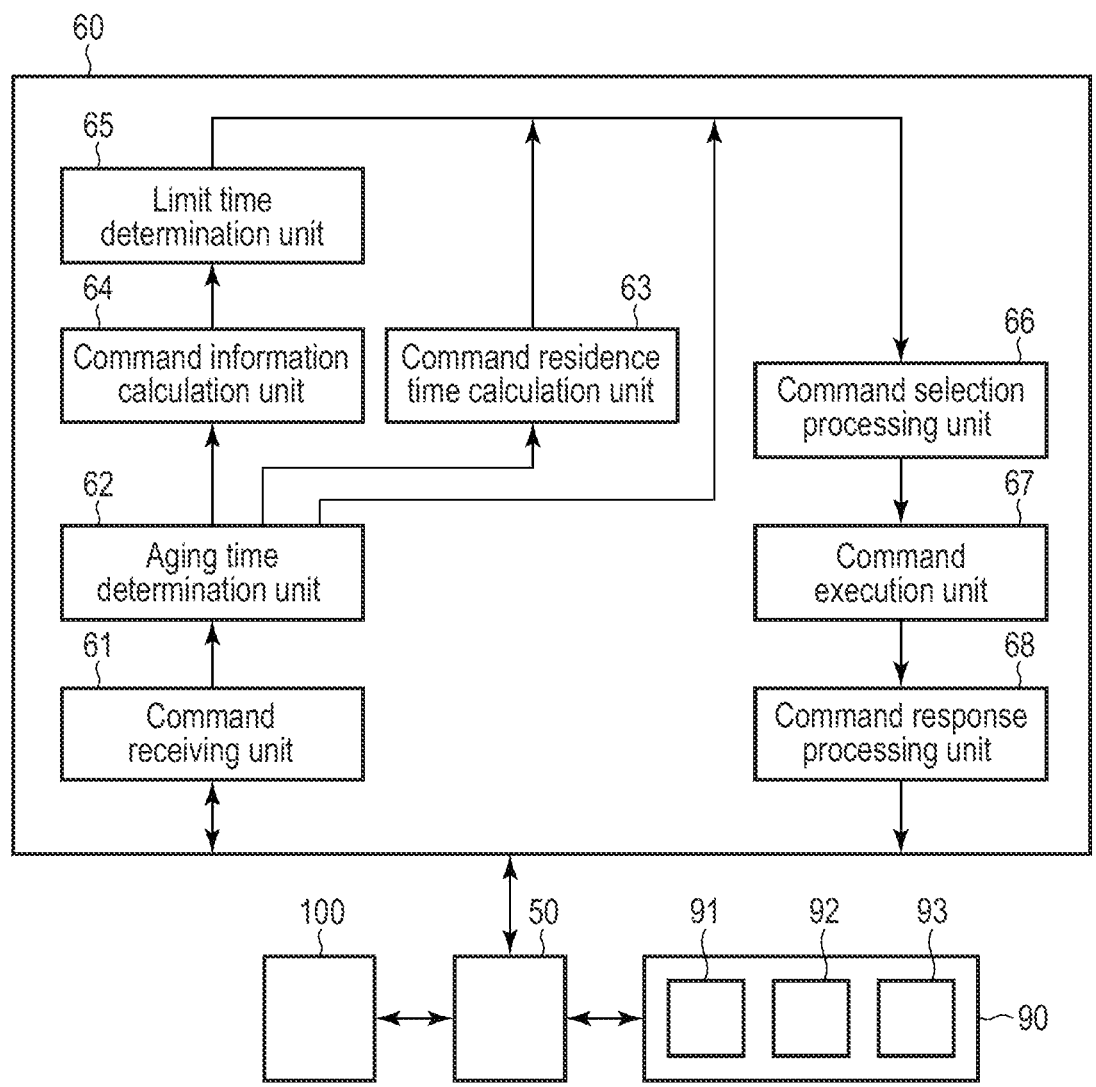
F I G. 10

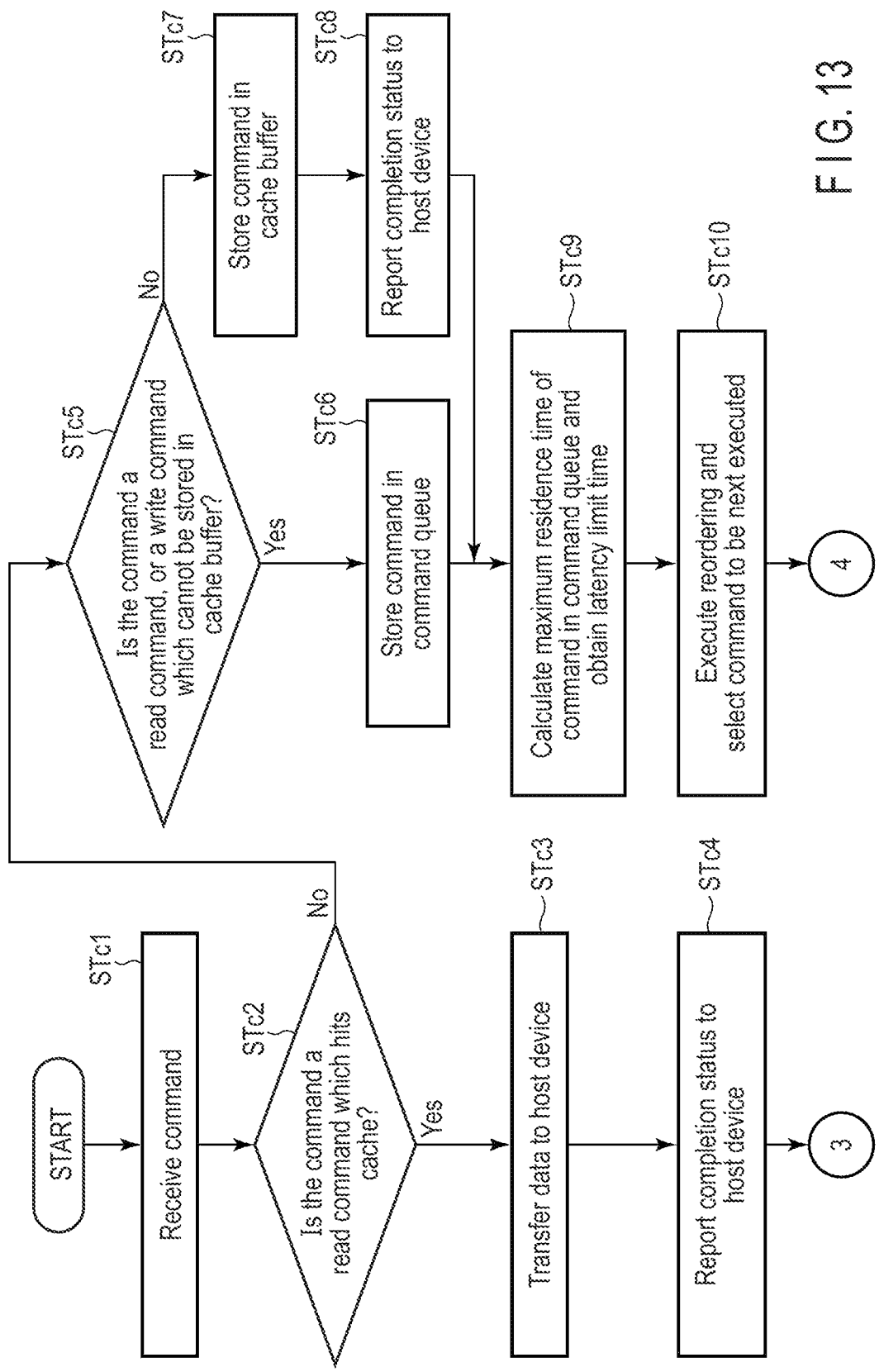
F I G. 13

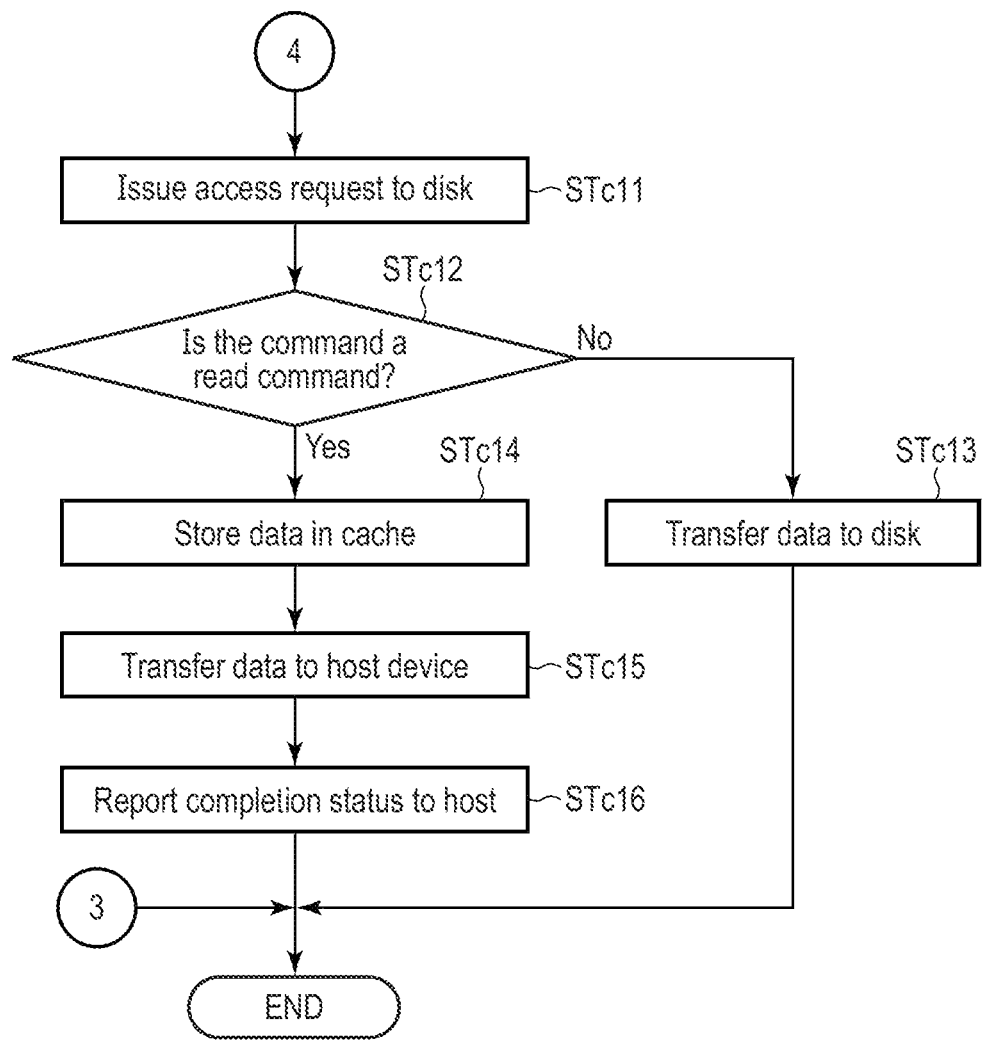
F I G. 14

MAGNETIC DISK DEVICE AND COMMAND PROCESSING METHOD

CROSS-REFERENCE TO RELATED APPLICATIONS

This application is based upon and claims the benefit of priority from Japanese Patent Application No. 2022-138628, filed Aug. 31, 2022, the entire contents of which are incorporated herein by reference.

FIELD

Embodiments described herein relate generally to a magnetic disk device and a command processing method.

BACKGROUND

A magnetic disk device comprises a command queue that can primarily and temporarily store a plurality of commands received from a host device such as a personal computer. The plurality of commands are queued in the order in which the commands are received by the magnetic disk device.

The magnetic disk device is evaluated based on various performance evaluation indices, which includes a command response performance. The time required to complete execution of each command sent from a host device to a magnetic disk device is referred to as a command response time, and the command response performance is evaluated based on the command response time. The magnetic disk device reads information from a disk and writes information to a disk in accordance with commands issued by a host device.

By the way, if a magnetic disk device executes a plurality of commands in the order of being received, a mechanical latency including a seek time and a rotational latency may increase until a target sector of the disk is accessed. Therefore, when a magnetic disk device receives a plurality of commands, a reordering process is performed to rearrange a plurality of commands in the command queue. By adjusting (i.e. reordering) the order in which the commands are executed, access can be completed most efficiently and at a high speed, thereby contributing to the reduction of the above latency. In the above description, "access at a high speed" means to access a sector at the position accessible in a shortest distance among the sectors at positions which are next accessible from the current head position and the rotational position of the disk.

When the reordering process is performed as described above, some commands are not easily selected depending on selection of commands. Since this command is the command whose execution is not completed, from the viewpoint of the host device, the command response performance may be deteriorated.

BRIEF DESCRIPTION OF THE DRAWINGS

FIG. 1 is a block diagram showing a configuration of a magnetic disk device of a comparative example.

FIG. 7 is a first latency limit time determination table in a magnetic disk device of an embodiments.

FIG. 8 is a second latency limit time determination table in the magnetic disk device of the embodiment.

FIG. 9 is a third latency limit time determination table in the magnetic disk device of the above embodiment.

FIG. 10 is a block diagram showing an HDC, a MPU, a buffer memory, and a host device of the embodiment.

FIG. 13 is a flowchart showing a flow from receiving a command to executing the command and notifying a host device of a status, in the magnetic disk device of the embodiment.

FIG. 14 is a flowchart showing the flow following FIG. 13.

DETAILED DESCRIPTION

Figure 2:
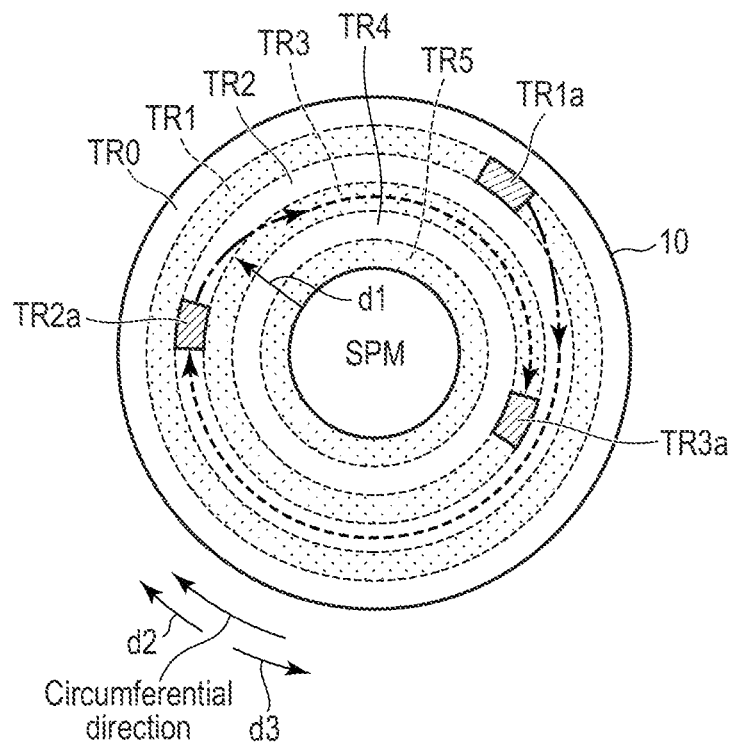
FIG. 2 is a schematic diagram showing an example of the arrangement of a plurality of tracks on a disk of the magnetic disk device, illustrating an example where when a command 1, a command 2, and a command 3 are received in order, the reordering is not executed but the command 1, the command 2, and the command 3 are executed in order.

In general, according to one embodiment, there is provided a magnetic disk device comprising: a disk; a head writing data to the disk and reading data from the disk; a command queue temporarily storing one or more commands received; a command residence time calculation unit calculating a residence time of each of the commands in the command queue; a command information calculation unit calculating the number of the commands in the command queue, and a ratio of read commands to write commands in the command queue; a limit time determination unit obtaining a latency limit time corresponding to the number of commands and the ratio, from among a plurality of latency limit times in a latency limit time determination table; and a command selection processing unit selecting a command to be executed, by considering the latency limit time obtained by the limit time determination unit.

According to another embodiment, there is provided a command processing method which is applied to a magnetic disk device comprising a disk, a head writing data to the disk and reading data from the disk, and a command queue temporarily storing one or more commands received. The method comprises: calculating a residence time of each of the commands in the command queue; calculating the number of the commands in the command queue, and a ratio of read commands to write commands in the command queue; obtaining a latency limit time corresponding to the number of commands and the ratio, from among a plurality of latency limit times in a latency limit time determination table; and selecting a command to be executed, by considering the obtained latency limit time.

Comparative Example

First, a comparative example will be described with reference to drawings. FIG. 1 is a block diagram showing a configuration of a magnetic disk device 1 of the comparative example.

As shown in FIG. 1, the magnetic disk device 1 comprises a head disk assembly (HDA), a driver IC 20, a head amplifier integrated circuit (hereinafter referred to as a head amplifier IC or a preamplifier) a volatile memory 70, a nonvolatile memory 80, a buffer memory (buffer) 90, and a system controller 130 that is a single-chip integrated circuit. In addition, the magnetic disk device 1 is connected to a host device (host) 100.

The HDA includes a magnetic disk (hereinafter referred to as a disk) 10, a spindle motor (hereinafter referred to as an SPM) 12, an arm 13 on which a head 15 is mounted, and a voice coil motor (hereinafter referred to as a VCM) 14. The disk 10 is attached to the SPM 12 and is rotated by driving the SPM 12. The arm 13 and the VCM 14 constitute an actuator. The actuator controls movement of the head 15 mounted on the arm 13 to a predetermined position of the disk 10 by driving the VCM 14. The magnetic disk device 1 may comprise a plurality of disks 10 and a plurality of heads 15.

On the disk 10, a user data area 10a which can be used by the user, a media cache (or often referred to as a media cache area) 10b where data (or commands) transferred from the host device or the like are temporarily stored before written to a predetermined area of the user data area 10a, and a system area 10c where information necessary for system management is written, are allocated to an area where the data can be written. The media cache 10b may not be arranged on the disk 10.

A direction from the inner circumference to an outer circumference of the disk 10 is hereinafter referred to as a radial direction. In the radial direction, a direction from the inner circumference to the outer circumference is referred to as an outward direction (outside), and a direction from the outer circumference to the inner circumference is referred to as an inward direction (inside). A direction perpendicular to the radial direction on the disk 10 is referred to as a circumferential direction. The circumferential direction corresponds to a direction along the circumference of the disk 10.

In addition, a predetermined position of the disk 10 in the radial direction may be referred to as a radial position, and a predetermined position of the disk 10 in the circumferential direction may be referred to as a circumferential position. The radial position and the circumferential position may be collectively and simply referred to as a position. The radial position corresponds to a distance from the center of rotation of the disk 10 to a predetermined radial position, a distance from the innermost circumference of the disk 10 to a predetermined radial position, a distance from a predetermined radial position of the disk 10 to another radial position, or the like.

The disk 10 is classified into a plurality of areas (hereinafter referred to as zones) for respective predetermined ranges of the radial direction. The zone includes a plurality of tracks. The areas classified in the radial direction of the disk 10 may also be referred to as radial areas. The radial areas include one or more zones, a plurality of tracks, and the like.

The "track" is used to indicate one of a plurality of areas divided in the radial direction on the disk 10, a path of the head 15 at a predetermined radial position, data extending in the circumferential direction on the disk 10, data of one circumference written to the track at a predetermined radial position, data written to a predetermined track on the disk 10, a part of data written to a predetermined track on the disk 10, or other various meanings.

The "sector" is used to indicate one of a plurality of areas obtained by dividing a predetermined track on the disk 10 in the circumferential direction, data written to a predetermined circumferential position at a predetermined radial position on the disk data written to a predetermined sector of a predetermined track on the disk 10, and other various meanings.

The "width of the track in the radial direction" may be referred to as a "track width". The "path through the central position of the track width in a predetermined track" may be referred to as a "track center". The "width of the sector in the radial direction" may be referred to as a "sector width". The "path through the central position of the sector width in a predetermined sector" may be referred to as a "sector center". A sector center corresponds to a track center. The terms "same", "identical", "matching", "equivalent" and the like imply not only the meaning of being exactly the same, but also the meaning of being different to the extent that they can be regarded as substantially the same. The "track center of a predetermined track" may be hereinafter simply referred to as a "track". In addition, the "sector center of a predetermined sector" may be simply referred to as a "sector".

The head 15 comprises a write head 15W and a read head 15R, which are mounted on a slider as a main body. The write head 15W writes data on the disk 10. In the following descriptions, "writing data" may be referred to as "writing", "data write", "write process", and the like. The read head 15R reads data recorded on the disk 10. In the following descriptions, "reading data" may be referred to as "reading", "data read", "read process", and the like.

The write head 15W is often simply referred to as the head 15, the read head 15R is often simply referred to as the head 15, or the write head 15W and the read head 15R are often referred to as the head 15 as a whole. A central part of the head 15 is often simply referred to as the head 15, a central part of the write head 15W is often simply referred to as the write head 15W, or a central part of the read head 15R is often simply referred to as the read head 15R.

The "central part of the write head 15W" may be simply referred to as the "head 15", and the "central part of the read head 15R" may be simply referred to as the "head 15". In the following descriptions, "positioning the central part of the head in a track center of a predetermined track" may be referred to as "positioning the head 15 on a predetermined track", "arranging the head 15 on a predetermined track", "locating the head 15 on a predetermined track", and the like.

The system controller 130 comprises a read/write (R/W) channel 40, a hard disk controller (HDC) 50, and a microprocessor (MPU) 60.

The driver IC 20 controls driving of the SPM 12 and the VCM 14 under control of the system controller 130 (more specifically, the MPU 60).

A head amplifier IC (preamplifier) 30 comprises a read amplifier and a write driver. The read amplifier amplifies a read signal read from the disk 10 and outputs the amplified read signal to the system controller 130 (more specifically, the read/write (R/W) channel 40). The write driver outputs a write current corresponding to the signal output from the R/W channel 40 to the head 15.

The volatile memory 70 is a semiconductor memory in which stored data is lost when power supply is cut off. The volatile memory 70 stores data necessary for processing in each of the units of the magnetic disk device 1, and the like. The volatile memory 70 is, for example, a dynamic random access memory (DRAM) or a synchronous dynamic random access memory (SDRAM).

The nonvolatile memory 80 is a semiconductor memory that records stored data even when the power supply is cut off. The nonvolatile memory 80 is, for example, a NOR or NAND flash read only memory (FROM).

The buffer memory 90 is a semiconductor memory that temporarily records data transmitted and received between the magnetic disk device 1 and the host device 100, and the like. The buffer memory 90 may be configured integrally with the volatile memory 70. The buffer memory 90 is a DRAM, a static random access memory (SRAM), an SDRAM, a ferroelectric random access memory (FeRAM), a magnetoresistive random access memory (MRAM), or the like. The buffer memory 90 includes an area used as a command queue 91, an area used as a cache buffer 92, and an area used as a cache 93.

The command queue 91 temporarily stores one or more received commands. The cache buffer 92 serves as a write cache. The cache buffer 92 temporarily stores one or more commands in place of the command queue 91. The cache 93 functions as a read cache.

The system controller (controller) 130 is realized by using, for example, a large-scale integrated circuit (LSI) referred to as a system-on-a-chip (SoC) in which a plurality of elements are integrated on a single chip. The system controller 130 is electrically connected to, for example, the driver IC 20, the head amplifier IC 30, the volatile memory the nonvolatile memory 80, the buffer memory 90, and the host device 100.

In accordance with instructions from the MPU to be described later, the R/W channel 40 executes signal processing, for example, modulation, demodulation, encoding, and decoding of the read data transferred from the disk 10 to the host device 100 and the write data transferred from the host device 100. The R/W channel 40 comprises a circuit or a function for measuring the signal quality of read data. The R/W channel 40 is electrically connected to the head amplifier IC 30, the HDC 50, the MPU 60 and the like.

The HDC 50 controls data transfer between the host device 100 and the R/W channel 40 in response to instructions from the MPU 60. The HDC 50 is electrically connected to, for example, the R/W channel the MPU 60, the volatile memory 70, the nonvolatile memory 80, the buffer memory 90, and the like.

The MPU 60 is a main controller that controls each of the units of the magnetic disk device 1. The MPU 60 controls the VCM 14 via the driver IC 20 to execute servo control for positioning the head 15. In addition, the MPU 60 controls the SPM 12 via the driver IC 20 to rotate the disk 10. The MPU 60 controls the operation of writing data to the disk 10 and selects the storage destination of the write data. In addition, the MPU 60 controls the operation of reading data from the disk 10 and controls the processing of read data. Furthermore, the MPU 60 manages an area in which data is recorded. The MPU 60 is connected to each of the units of the magnetic disk device 1. The MPU 60 is electrically connected to the driver IC 20, the R/W channel 40, the HDC 50, and the like.

Performance indices used in the magnetic disk device 1 will be described here. Various performance indices are used in magnetic disk device 1, and the generally emphasized performance indices are input/output operations per second (IOPS), transfer rate, and latency.

The IOPS is the number of reads and writes per second. The IOPS represents the capability of processing throughput of the magnetic disk device 1. As the IOPS is higher, the transfer performance of the magnetic disk device 1 is better.

The transfer rate is the number of bytes/bits that can be transferred to the magnetic disk device 1 per second (MB/s or bps). The transfer rate represents the capability of processing throughput of the magnetic disk device 1. As the transfer rate is higher, the transfer performance of the magnetic disk device 1 is better.

The latency means delay and represents the time to complete execution per command sent from the host device 100. The latency represents the command response performance of the magnetic disk device 1. As the latency is lower, the response performance of the magnetic disk device 1 is better.

Other performance indices in terms of vibration, temperature, power consumption, BenchMark score, OS start-up time, file copy time, and the like are used in the magnetic disk device 1.

Figure 3:
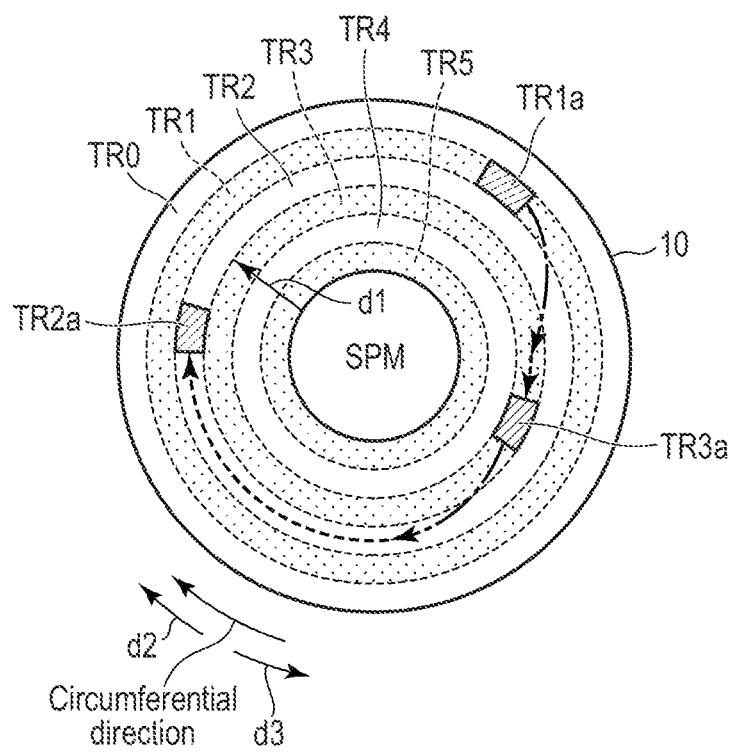
FIG. 3 is a schematic diagram showing an example of the arrangement of a plurality of tracks on a disk of the magnetic disk device, illustrating an example where when a command 1, a command 2, and a command 3 are received in order, the reordering is executed and the command 1, the command 3, and the command 2 are executed in order.

Next, an example of command processing will be described. FIG. 2 is a schematic diagram showing an example of the arrangement of a plurality of tracks TR0, TR1, TR2, TR3, TR4, and TR5 on the disk 10 of the magnetic disk device 1, illustrating an example where when command 1, command 2, and command 3 are received in order, the command 1, the command 2, and command 3 are not subjected to reordering but executed in order. FIG. 3 is a schematic diagram showing an example of the arrangement of a plurality of tracks TR0 to TR5 on the disk 10 of the magnetic disk device 1, illustrating an example where when the command 1, the command 2, and the command 3 are received in order, the reordering is executed and the command 1, the command 3, and the command 2 are executed in order.

In FIG. 2 and FIG. 3, arrows of one-dot chain lines indicate seek, which is the movement from a current track to a target track. Arrows of dashed lines indicate the rotational wait operation after movement of the head to the target track is completed until the target sector comes around. In the circumferential direction, the direction of rotation of the disk 10 is referred to as a rotational direction d3. In the example shown in FIG. 2 and FIG. 3, the rotational direction d3 is indicated in a counterclockwise direction, but may be indicated in an opposite direction (clockwise direction). In addition, a traveling direction d2 of the head 15 to the disk 10 is opposite to the rotational direction d3.

As shown in FIG. 2, when the host device 100 issues a plurality of commands and the magnetic disk device 1 receives a plurality of commands at once, the magnetic disk device 1 processes the plurality of commands one by one in the order of receiving the commands. For example, when the magnetic disk device 1 receives the command 1, the command 2, and the command 3 in order, the magnetic disk device 1 does not execute reordering but executes the command 1, the command 2, and the command 3 in order.

First, the magnetic disk device 1 executes the command 1 for the execution area TR1a of the track TR1. Then, seek and rotation wait operation are executed, and the command 2 is executed for an execution area TR2a of the track TR2. Next, seek and rotation wait operation are executed, and the command 3 is executed for an execution area TR3a of the track TR3. Each of the execution area TR1a, the execution area TR2a, and the execution area TR3a includes one or more sectors. In addition, in the radial direction d1, the execution area TR2a is located on an inner side than the execution area TR1a, and the execution area TR3a is located on an inner side than the execution area TR2a.

In the example shown in FIG. 2, a distance from the current execution area to the next execution area becomes longer. More specifically, the distance from the trailing part of the trailing sector of the current execution area to the leading part of the leading sector of the next execution area becomes longer in the traveling direction d2. Then, the rotational latency becomes longer. Since the efficiency of command processing can hardly be increased, it is difficult to increase the IOPS.

In contrast, as shown in FIG. 3, the magnetic disk device 1 rearranges a plurality of commands in a reasonable order and processes the commands. For example, when receiving the command 1, the command 2, and the command 3 in order, the magnetic disk device 1 determines that it is possible to access the execution area TR3a following the execution area TR1a. The magnetic disk device 1 reorders and executes the command 1, the command 3, and the command 2 in order.

First, the magnetic disk device 1 executes the command 1 for the execution area TR1a of the track TR1. Then, the magnetic disk device 1 executes the seek and the rotation wait operation, and executes the command 3 for the execution area TR3a of the track TR3. Next, the magnetic disk device 1 executes the seek and the rotation wait operation and executes the command 2 for the execution area TR2a of the track TR2.

In the example shown in FIG. 3, the distance from the current execution area to the next execution area can be minimized. In other words, the rotational latency can be shortened. Then, the processing of the commands 1, 2, and 3 can be completed at the highest speed. The efficiency of the command processing (read and write processing) can be increased, and the IOPS can be increased.

A method of managing the commands in the magnetic disk device 1 will be described.

As shown in FIG. 1, when accumulating a plurality of commands inside the magnetic disk device 1, the magnetic disk device 1 can employ two types of command management methods, i.e., a command management method using a command queue 91 and a command management method using a cache buffer 92. In both command management methods, the magnetic disk device 1 employs a queuing mechanism.

The command queue 91 can accumulate commands issued by the host device 100 in advance. When the interface of the magnetic disk device 1 is Serial Attached Small Computer System Interface (SAS), the Queue Depth is 128. When the interface of the magnetic disk device 1 is Serial Advanced Technology Attachment (SATA), the Queue Depth is 32.

In the SAS, a maximum of 128 commands can be queued in the command queue 91. The magnetic disk device 1 employing the SAS can further obtain the advantage of increasing the IOPS by the above-described reordering. The commands accumulated in the command queue 91 are read commands and write commands that cannot be stored in the cache buffer 92.

In contrast, the commands accumulated in the cache buffer 92 are a plurality of write commands. When receiving the write commands stored in the cache buffer 92, the magnetic disk device 1 also receives data corresponding to the above write commands (data to be written to the disk 10). When writing the write commands to the write cache (in the comparative example, the cache buffer 92), the magnetic disk device 1 notifies the host device 100 of the status, and executes the write processing to the disk 10 later.

The throughput can be improved by using the cache buffer 92. The cache buffer 92 can accumulate tens of thousands of write commands. The MPU 60 can register a plurality of write commands in the cache buffer 92 and can manage a plurality of write commands registered in the cache buffer 92.

As shown in FIG. 3, when reordering, the magnetic disk device 1 can therefore select the next command to execute from the commands in the command queue 91 and the commands in the cache buffer 92.

Figure 4:
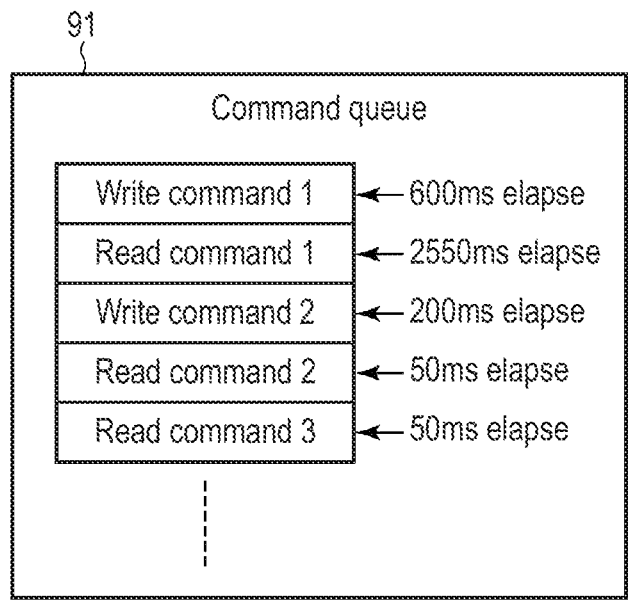
FIG. 4 is a view showing a plurality of commands in the command queue shown in FIG. 1, illustrating an example in which an unexecuted command exceeding an aging time remains in the command queue.

Next, a method of managing a command processing time will be described. FIG. 4 is a table showing a plurality of commands included in the command queue 91 shown in FIG. 1, illustrating an example that unexecuted commands that exceed an aging time remain in the command queue 91.

As shown in FIG. 4, the magnetic disk device 1 executes reordering, emphasizing increase of the IOPS as described above. For this reason, in some cases, a command which is not selected all the time and put off remains in the command queue 91, similarly to a read command 1. The magnetic disk device 1 cannot make a status notification (response to the completion of execution of the read command 1) to the host device 100. Then, the host device 100 may determine the status as a command timeout, also determine an abnormality of the magnetic disk device 1, or cause the magnetic disk device 1 to reissue the read command 1.

Therefore, in order to avoid a situation that the magnetic disk device 1 is determined abnormal and a situation that the host device 100 reissues the command, the magnetic disk device 1 monitors the residence time of each command in the command queue 91. When monitoring the above residence time, the magnetic disk device 1 determines whether the residence time exceeds the monitoring time. The above monitoring time is also referred to as an aging time and can be set arbitrarily by the user.

For example, when the aging time is set to 2,500 ms, the magnetic disk device 1 can monitor whether the command queue 91 includes a command whose resistance time exceeds the aging time (2,500 ms). In the example shown in FIG. 4, since the residence time of the read command 1 is 2,550 ms and exceeds the aging time, the magnetic disk device 1 can forcibly select and execute the read command 1 with the highest priority.

Figure 5:
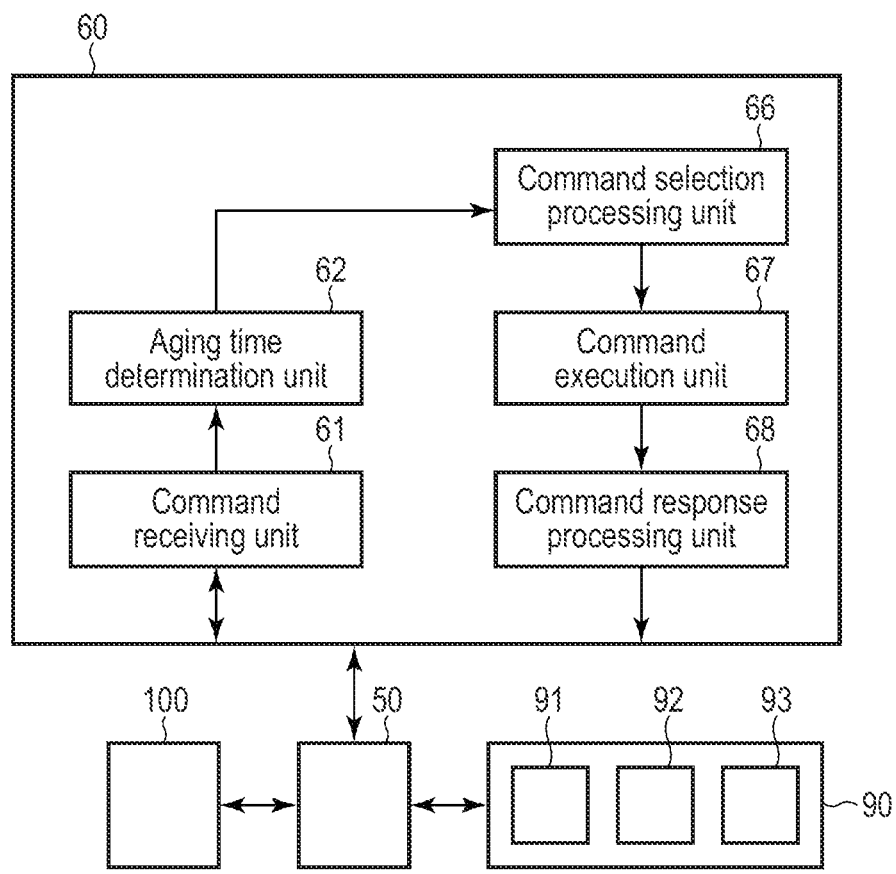
FIG. 5 is a block diagram showing HDC, MPU, a buffer memory, and a host device shown in FIG. 1.

Next, the configuration of the MPU 60 which can manage the command processing time will be described. FIG. 5 is a block diagram showing the HDC the MPU 60, the buffer memory 90, and the host device 100 shown in FIG. 1.

As shown in FIG. 5, the MPU 60 comprises a command receiving unit 61, an aging time determination unit 62, a command selection processing unit 66, a command execution unit 67, and a command response processing unit 68. The command receiving unit 61 receives commands issued by the host device 100 via the HDC 50.

The aging time determination unit 62 determines whether the command queue 91 includes a command whose residence time exceeds the aging time. The command selection processing unit 66 selects the command to be next executed from the command queue 91 and the cache buffer 92 by considering a result of the determination executed by the aging time determination unit 62.

The command execution unit 67 executes the command selected by the command selection processing unit 66. The command response processing unit 68 executes the status notification (response of the command execution completion) to the host device 100 via the HDC 50.

Figure 6:
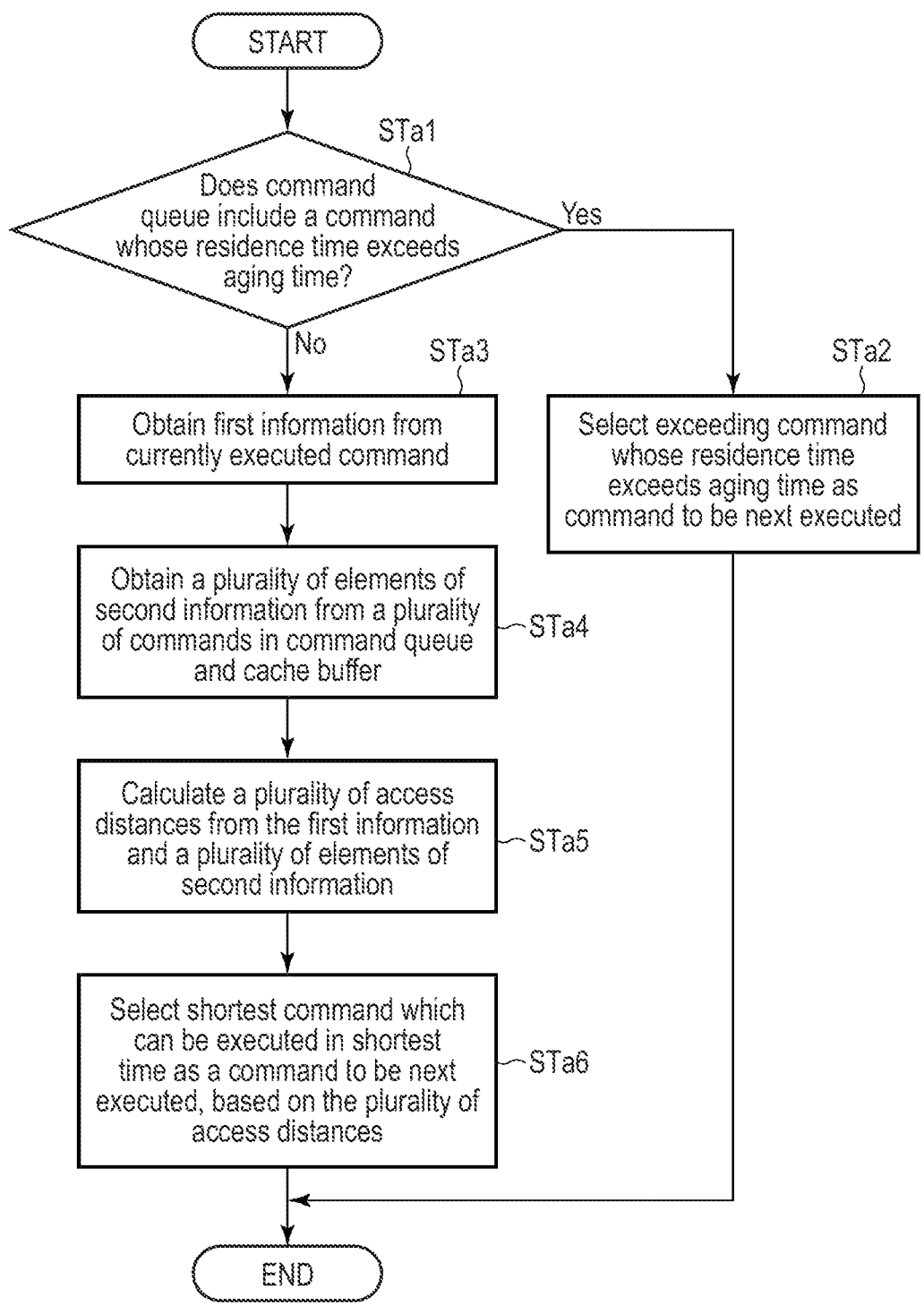
FIG. 6 is a flowchart showing a command processing method of the comparative example, and is used to illustrate a command processing method that can efficiently execute commands while considering the aging time.

Next, the command processing method of the comparative example will be described. FIG. 6 is a flowchart showing the command processing method of the comparative example, and is used to describe the command processing method that can efficiently execute commands while considering the aging time. A command selection method among the command processing method will be described here.

As shown in FIG. 6 and FIG. 5, when the command selection method of the comparative example is started, the aging time determination unit 62 first determines whether the command queue 91 includes a command whose residence time exceeds the aging time, in step STa1. If the command queue 91 includes a command whose residence time exceeds the aging time, the flow shifts to step STa2 and the command selection processing unit 66 selects an exceeding command whose residence time exceeds the aging time as a command to be next executed, from the command queue 91. The command selection method is thereby ended.

In contrast, if the command queue 91 does not include a command whose residence time exceeds the aging time (step STa1), the flow shifts to step STa3 and the command selection processing unit 66 obtains first information from the currently executed command. The first information includes information on the cylinder (execution track corresponding to the currently executed command), the head 15, and the sector (trailing execution sector of the execution area among the above execution track).

Then, in step STa4, the command selection processing unit 66 obtains a plurality of elements of second information from the plurality of commands in the command queue 91 and cache buffer 92. Each element of the second information includes information on the cylinder (candidate track corresponding to one of the plurality of commands), the head 15, and the sector (leading candidate sector of a candidate area among the candidate track).

After that, in step STa5, the command selection processing unit 66 calculates a plurality of access distances (travel distances including the seek distance) from the first information and the plurality of elements of second information. Each of the access distances is a distance from the trailing part of the execution sector to the leading part of the candidate sector. Next, the flow shifts to step STa6, and the command selection processing unit 66 selects the shortest command that can be executed in the shortest time as the command to be next executed, from among the plurality of commands in the command queue 91 and cache buffer 92, based on the plurality of access distances. The command selection method is thereby ended.

After the command selection is completed, the command execution unit 67 executes the command selected by the command selection processing unit 66. The command response processing unit 68 executes the status notification (response of the command execution completion) to the host device 100 via the HDC 50. The command processing method including the command selection method is thereby ended.

According to the magnetic disk device 1 and command processing method according to the comparative example configured as described above, the magnetic disk device 1 can efficiently execute the commands while considering the aging time. Conversely, however, the command execution cannot be completed unless the command residence time exceeds the aging time in the command queue 91. In addition, the aging time is applied uniformly to all the commands in all the queues stored in the command queue 91. For example, the aging time is fixed regardless of whether the number of commands in the command queue 91 is 1 or 128. Furthermore, the aging time is also fixed even if the ratio of the read commands to the write commands in the command queue 91 changes.

For this reason, even if the magnetic disk device 1 needs to respond earlier than the aging time set by the host device 100 or if the response time of the magnetic disk device 1 needs to be changed at a certain command pattern from the host device 100, depending on the usage conditions of the magnetic disk device 1, the magnetic disk device 1 cannot change the response time. Uniformly monitoring the command residence time in the command queue 91 simply using the aging time is not enough to respond to the above request, resulting in slowing down the command response of the magnetic disk device 1.

In addition, the command response can also be controlled by a function of limiting the number of times of replacing the command, as disclosed in JP3793682B, but the response time cannot be controlled since the control is the control based on the number of times of replacement.

In the comparative example, there is a problem that command response control according to access patterns cannot be executed. For this reason, there is a problem that the command response performance cannot be improved and user requirements cannot be satisfied.

In addition, in recent years, the number of commands that can be accumulated in the magnetic disk device 1 has increased due to improvement of the IOPS. For this reason, the commands with slower response times increase, and the user requirements cannot be satisfied.

For the reason described above, the user requirements cannot be satisfied by simply reordering while considering the aging time to efficiently execute the commands.

Therefore, in an embodiment to be next described, a magnetic disk device 1 and a command processing method capable of efficiently execute commands by reordering while considering the response time can be obtained. More specifically, the magnetic disk device 1 and a command processing method can control the response time every time the number of commands in the command queue 91 changes, and can control the response time every time the ratio of the read commands to the write commands (R/W ratio) in the command queue 91 changes. This enables the magnetic disk device 1 to control the command response according to the access pattern.

Embodiment

Next, one of embodiments will be described. The magnetic disk device 1 is configured in the same manner as the above-described comparative example except for constituent elements to be described in the embodiment. FIG. 7 shows a first latency limit time determination table included in the magnetic disk device 1 of the embodiment. FIG. 8 shows a second latency limit time determination table included in the magnetic disk device 1 of the embodiment. FIG. 9 shows a third latency limit time determination table included in the magnetic disk device 1 of the embodiment.

In FIG. 7 through FIG. 9, the unit for latency limit time is milliseconds ([ms]). The R/W ratio is 0% when all the commands in the command queue 91 are the write commands, and the R/W ratio is 100% when all the commands in the command queue 91 are the read commands. Each latency limit time in each of the latency limit time determination tables is shorter than the aging time (for example, 2,500 ms).

In other words, the aging time is longer than the latency limit time.

Each latency limit time in column "0%" is applied to the command queue 91 in which the the R/W ratio is 0% or more and less than 10%, each latency limit time in column "10%" is applied to the command queue 91 in which the the R/W ratio is 10% or more and less than 20%, each latency limit time in column "20%" is applied to the command queue 91 in which the R/W ratio is 20% or more and less than 30%, . . . , each latency limit time in column "90%" is applied to the command queue 91 in which the R/W ratio is 90% or more and less than 100%, and each latency limit time in column "100%" is applied to the command queue 91 in which the R/W ratio is 100%.

Each of the latency limit time determination tables may define only the required latency limit time.

For example, when the number of commands received at one time is 1, the R/W ratio is 0% or 100%. When the number of commands is 1, each of the latency limit time determination tables may define the latency limit time in a case where the R/W ratio is 0% and the latency limit time in a case where the R/W ratio is 100%.

As another example, when the number of commands received at one time is 2, the R/W ratio is 0%, 50%, or 100%. When the number of commands is 2, each of the latency limit time determination tables may define the latency limit time in a case where the R/W ratio is 0%, the latency limit time in a case where the R/W ratio is 50%, and the latency limit time in a case where the R/W ratio is 100%.

As shown in FIG. 7, the first latency limit time determination table defines a plurality of latency limit times. A plurality of latency limit times in the first latency limit time determination table are set individually according to the number of commands and the R/W ratio. For example, in the command queue 91 in which the number of commands received at one time is 32 and the R/W ratio is 100%, the latency limit time is 900 ms. The magnetic disk device 1 can control the command response according to the access pattern by using the first latency limit time determination table.

The plurality of latency limit times are set to be longer as the number of commands increases when the R/W ratio is fixed. In addition, the plurality of latency limit times are set to be longer as the R/W ratio approaches the range of 90 to 99% when the number of commands is fixed.

When the R/W ratio is 0% and a number of write commands can be stored in the cache buffer 92, the command response can be executed faster than the latency limit time. For this reason, the case where the latency limit time is used for the command queue 91 in which the R/W ratio is 0% is the case where the cache buffer 92 is not vacant or the case where a number of write commands cannot be stored in the cache buffer 92.

When the R/W ratio is 100%, the commands in the command queue 91 are only the read commands. In this case, since the write commands are not processed in between, the latency limit time in the case where the R/W ratio is 100% is set to be short as understood from FIG. 7.

As shown in FIG. 8, in the second latency limit time determination table, each latency limit time is set to be shorter as a whole than that in the first latency limit time determination table shown in FIG. 7. The second latency limit time determination table is suitable when the latency is lowered to improve the response performance of the magnetic disk device 1, but the IOPS may be lowered.

As shown in FIG. 9, in the third latency limit time determination table, each latency limit time is set to be longer as a whole than that in the first latency limit time determination table shown in FIG. 7. The third latency limit time determination table is suitable when it is necessary to make the IOPS higher and improve the throughput, but the latency may be higher.

The plurality of latency limit time determination tables described above are stored in, for example, the nonvolatile memory 80. The user can switch the latency limit time determination tables to be used by the magnetic disk device 1.

Next, the configuration of the MPU 60 which can manage the command processing time will be described. FIG. 10 is a block diagram showing the HDC the MPU 60, the buffer memory 90 of the embodiment, and the host device 100.

As shown in FIG. 10, the MPU 60 comprises the command receiving unit 61, the aging time determination unit 62, a command residence time calculation unit 63, a command information calculation unit 64, a limit time determination unit 65, the command selection processing unit 66, the command execution unit 67, and the command response processing unit 68.

The command receiving unit 61 receives commands issued by the host device 100 via the HDC 50. The command receiving unit 61 stores the received commands in the command queue 91 or the cache buffer 92.

The aging time determination unit 62 determines whether the command queue 91 includes a command whose residence time exceeds the aging time. For example, the aging time determination unit 62 determines whether an unexecuted second exceeding command that exceeds the aging time remains in the command queue 91. As described above, the aging time is applied uniformly to all the commands in all the queues stored in the command queue 91.

The command residence time calculation unit 63 calculates the residence time of each command in the command queue 91. For example, the command residence time calculation unit 63 calculates the maximum residence time using the receipt time, which is one of elements of information for one or more commands in the command queue 91.

The command information calculation unit 64 calculates the number of commands in the command queue 91, and the ratio (R/W ratios) of the read commands to the write commands in the command queue 91, respectively. For example, the command information calculation unit 64 calculates the number of commands and the R/W ratio using the information on one or more commands in the command queue 91.

The limit time determination unit 65 uses the information calculated by the command information calculation unit 64, and the selected latency limit time determination table. The limit time determination unit 65 obtains the latency limit time corresponding to the number of commands and the R/W ratio, from among a plurality of latency limit times in the latency limit time determination table.

The command selection processing unit 66 selects the command to be next executed from the command queue 91 and the cache buffer 92 by considering a result of the determination executed by the aging time determination unit 62. Furthermore, the command selection processing unit 66 selects the command to be executed, by considering the latency limit time obtained by the limit time determination unit 65.

For example, when determining that the above second exceeding command remains in the command queue 91, the command selection processing unit 66 selects the second exceeding command as the command to be next executed, without considering the latency limit time.

In addition, when determining that the above second exceeding command does not remain in the command queue 91, the command selection processing unit 66 selects the command to be executed, by considering the latency limit time.

More specifically, the command selection processing unit 66 compares the maximum residence time calculated by the command residence time calculation unit 63 with the obtained latency limit time, and determines whether an unexecuted first exceeding command that exceeds the latency limit time remains in the command queue 91.

When determining that an unexecuted first exceeding command that exceeds the latency limit time remains in the command queue 91, the command selection processing unit 66 preferentially selects the first exceeding command as the command to be next executed and sends the command to the command execution unit 67.

When determining that an unexecuted first exceeding command that exceeds the latency limit time does not remain in the command queue 91, the command selection processing unit 66 selects the shortest command that can be executed in the shortest time from the plurality of commands in the command queue 91 and the cache buffer 92, as the command to be next executed, and sends the shortest command to the command execution unit 67.

The command execution unit 67 executes the command selected by the command selection processing unit 66. For example, the command execution unit 67 accesses the disk 10 according to the selected command and sends an execution completion notification to the command response processing unit 68.

The command response processing unit 68 executes the status notification (response of the command execution completion) to the host device 100 via the HDC 50.

Figure 11:
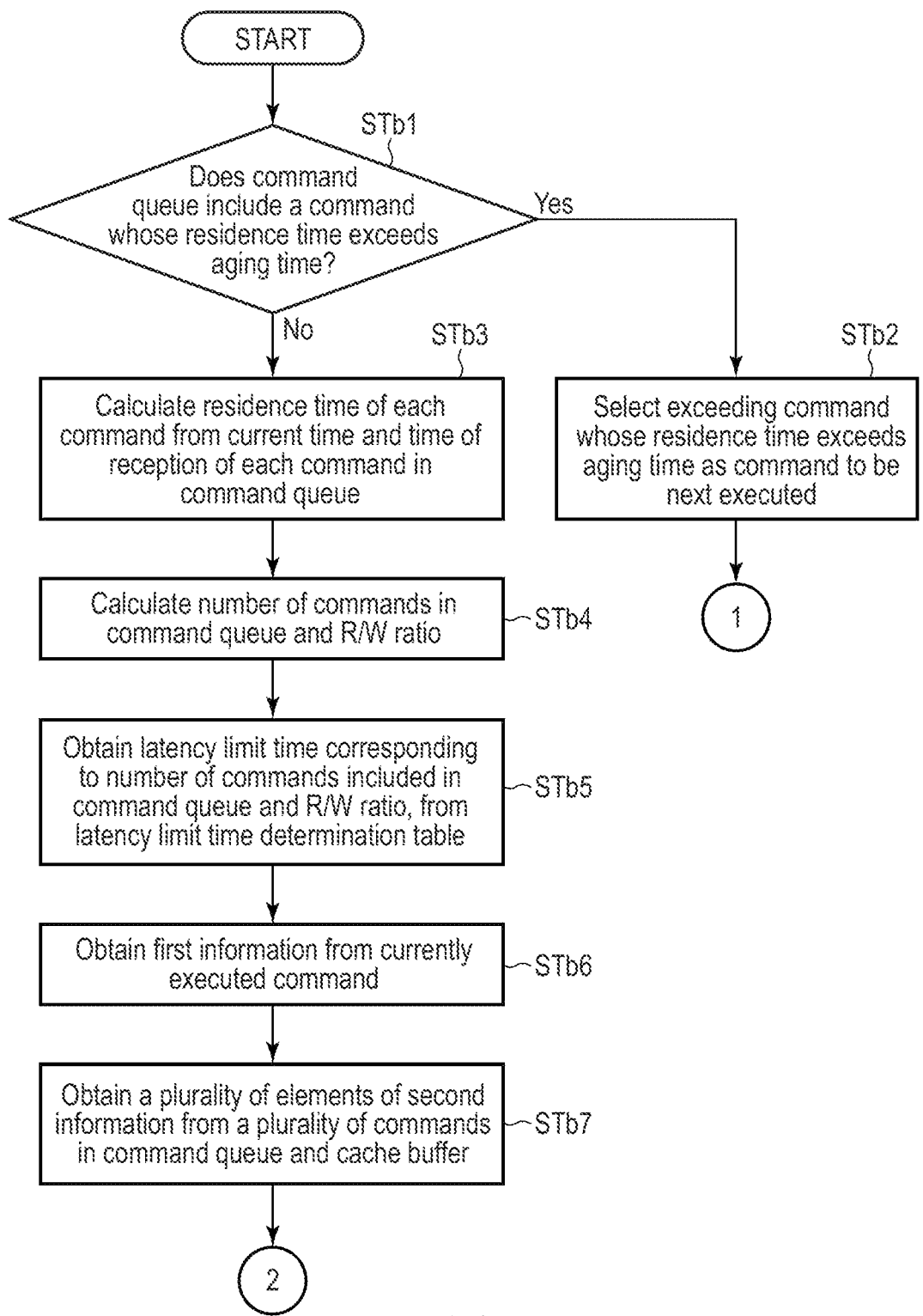
FIG. 11 is a flowchart showing a command processing method of the embodiment, and is used to illustrate a command processing method that can efficiently execute commands while considering the aging time and the latency limit time.
Figure 12:
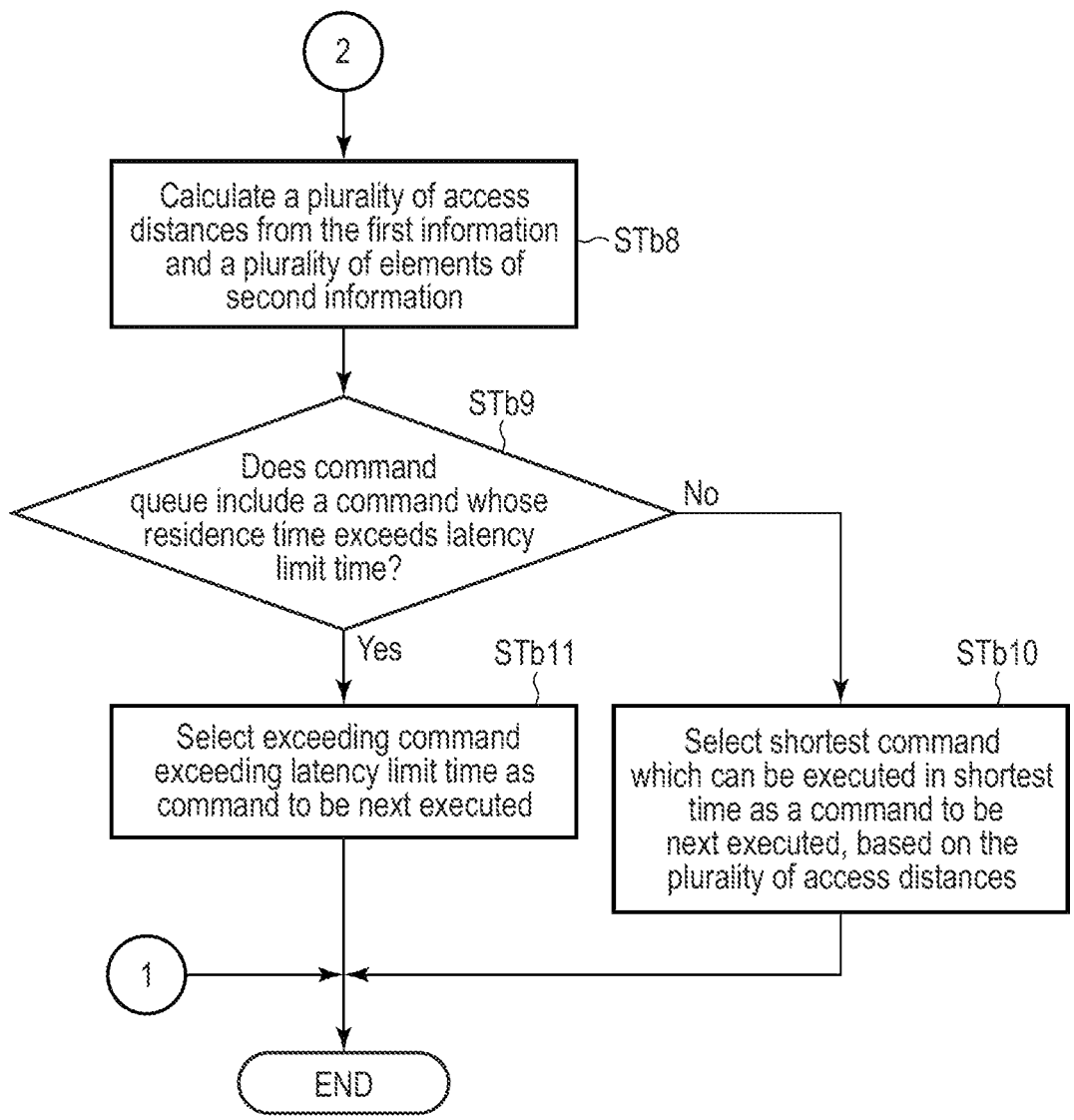
FIG. 12 is a flowchart showing the command processing method following FIG. 11.

Next, the command processing method of the embodiment will be described. FIG. 11 is a flowchart showing a command processing method of the embodiment, and is used to illustrate a command processing method that can efficiently execute commands while considering the aging time and the latency limit time. FIG. 12 is a flowchart showing the command processing method following FIG. 11. A command selection method among the command processing method will be described here.

As shown in FIG. 11 and FIG. 10, when the command selection method of the embodiment is started, the aging time determination unit 62 first determines whether the command queue 91 includes a command whose residence time exceeds the aging time, in step STb1. If the command queue 91 includes a command whose residence time exceeds the aging time, the flow shifts to step STb2 and the command selection processing unit 66 selects an exceeding command (second exceeding command) whose residence time exceeds the aging time as a command to be next executed, from the command queue 91. The command selection method is thereby ended.

Steps STb1 and STb2 are the same as steps of the command residence time monitoring method in the above comparative example, and may be used as a fail-safe in the embodiment. However, steps STb1 and STb2 may be omitted in the command selection method of the embodiment. In this case, the MPU 60 may be configured without the aging time determination unit 62.

In contrast, if the command queue 91 does not include a command whose residence time exceeds the aging time (step STb1), the flow shifts to step STb3 and the command residence time calculation unit 63 calculates the residence time of each command from the current time and the receipt time of each command in the command queue 91. For example, the command residence time calculation unit 63 can obtain the maximum residence time and specify the command with the maximum residence time.

In addition, in step STb4, the command information calculation unit 64 calculates command information such as the number of commands in the command queue 91 and the R/W ratio.

Then, in step STb5, the limit time determination unit 65 obtains the latency limit time corresponding to the number of commands in the command queue 91 and the R/W ratio from the latency limit time determination table. For example, in the case of the command queue 91 in which the number of commands received at a time is 16 and the R/W ratio is 50%, the limit time determination unit 65 can obtain a latency limit time (700 ms) from the first latency limit time determination table in FIG. 7.

Next, in step STb6, the command selection processing unit 66 obtains the first information from the currently executed command. The first information includes information on the cylinder (execution track corresponding to the currently executed command), the head 15, and the sector (trailing execution sector of the execution area among the above execution track).

Then, in step STb7, the command selection processing unit 66 obtains a plurality of elements of second information from the plurality of commands in the command queue 91 and cache buffer 92. Each element of the second information includes information on the cylinder (candidate track corresponding to one of the plurality of commands), the head 15, and the sector (leading candidate sector of a candidate area among the candidate track).

As shown in FIG. 12 and FIG. 10, after that, the command selection processing unit 66 calculates a plurality of access distances (travel distances including the seek distance) from the first information and the plurality of elements of second information, in step STb8. Each of the access distances is a distance from the trailing part of the execution sector to the leading part of the candidate sector.

Next, the flow shifts to step STb9, and the command selection processing unit 66 determines whether the command queue 91 includes a command whose residence time exceeds the latency limit time. For example, the command selection processing unit 66 determines whether the maximum residence time calculated by the command residence time calculation unit 63 exceeds the latency limit time obtained by the limit time determination unit 65.

If the command queue 91 does not include a command whose residence time exceeds the latency limit time (step STb9), the flow shifts to step STb10 and the command selection processing unit 66 selects the shortest command that can be executed in the shortest time as the command to be next executed, from among the plurality of commands in the command queue 91 and cache buffer 92, based on the plurality of access distances. The command selection method is thereby ended.

In contrast, if the command queue 91 includes a command whose residence time exceeds the latency limit time (step STb9), the flow shifts to step STb11 and the command selection processing unit 66 selects an exceeding command (first exceeding command) whose residence time exceeds the latency limit time as a command to be next executed, from the command queue 91. The command selection method is thereby ended.

After the command selection is completed, the command execution unit 67 executes the command sent from the command selection processing unit 66. The command response processing unit 68 executes the status notification (response of the command execution completion) to the host device 100 via the HDC 50. The command processing method including the command selection method is thereby ended.

Thus, the command response time considering the access patterns can be controlled by using the command processing method of the embodiment.

Next, a flow from receiving a command and executing the command until notifying the host device 100 of the status in the magnetic disk device 1 of the embodiment will be described. FIG. 13 is a flowchart showing the flow from receiving a command and executing the command until notifying the host device 100 of the status, in the magnetic disk device 1 of the embodiment. FIG. 14 is a flowchart showing the flow following FIG. 13.

As shown in FIG. 13 and FIG. 10, when the host device 100 issues a command and the processing is started by the magnetic disk device 1, the command receiving unit 61 first receives the command issued by the host device 100 via the HDC 50, in step STc1. Then, the command receiving unit 61 determines whether the received command is a read command that has hit the cache (read cache) 93, in step STc2.

If the received command is the read command that has hit the cache 93 (step STc2), the flow shifts to step STc3 and the command receiving unit 61 transfers (sends) the data to the host device 100 via the HDC 50, and the command receiving unit 61 reports a completion status to the host device 100 via the HDC 50 in step STc4.

As shown in FIG. 14, the processing executed by the magnetic disk device 1 is thereby ended.

In contrast, as shown in FIG. 13 and FIG. 10, if the command is not the read command that has hit the cache 93 (step STc2), the flow shifts to step STc5 and the command receiving unit 61 determines whether the received command is a read command that does not hit the cache 93 or a write command that cannot be stored in the cache buffer 92.

The "write command that cannot be stored in the cache buffer 92" means that the data to be written to the disk 10 cannot be received in advance. Alternatively, a write command cannot be stored in the cache buffer 92 if there is no free space in the cache buffer 92. If the size of the write command is larger than the capacity of the cache buffer 92, the write command cannot be stored in the cache buffer 92 either. A write command that specifies definitely writing not to the cache buffer 92 but to the disk 10 as a command option cannot be stored in the cache buffer 92 either.

If the received command corresponds to any of "the read command that does not hit the cache 93" and "the write command that cannot be stored in the cache buffer 92" (step STc5), the flow shifts to step STc6 and the command receiving unit 61 stores the command in the command queue 91.

If the received command does not correspond to any of "the read command that does not hit the cache 93" and "the write command that cannot be stored in the cache buffer 92" (step STc5), the flow shifts to step STc7 and the command receiving unit 61 stores the command in the cache buffer 92, and the command receiving unit 61 reports the completion status to the host device 100 via the HDC 50 in step STc8.

As described above, "the read command that does not hit the information in the cache 93" and "the write command" require access to the disk 10. However, if the write command is a write command that can be stored in the cache buffer 92, the command receiving unit 61 can report the completion status to the host device 100 without accessing the disk 10. If the write command is a write command that cannot be stored in the cache buffer 92, the write command is stored in the command queue 91 together with the read command.

After that, in step STc9, the command residence time calculation unit 63 calculates the maximum residence time of the commands in the command queue 91, and the limit time determination unit 65 and the command information calculation unit 64 obtain (select) the latency limit time from the latency limit time determination table. It is assumed here that the maximum residence time does not exceed the latency limit time.

Then, in step STc10, the command selection processing unit 66 reorders the commands in the command queue 91 and the commands in the cache buffer 92 to select the command to be next executed.

After that, as shown in FIG. 14 and FIG. 10, the command execution unit 67 issues an access request to the disk 10 according to the command selected by the command selection processing unit 66, in step STc11.

In step STc12, the command execution unit 67 determines whether the command selected by the command selection processing unit 66 is a read command.

If the selected command is not a read command (step STc12), i.e., if the selected command is a write command, the flow shifts to STc13 and the command execution unit 67 transfers the data to the disk 10. In other words, write processing to the disk 10 is executed and the processing executed by the magnetic disk device 1 is ended.

On the other hand, if the selected command is a read command (step STc12), the flow shifts to step STc14 and the command execution unit 67 stores the data read from the disk 10 in the cache 93. In step STc15, the magnetic disk device 1 can thereby transfer the data stored in the cache 93 to the host device 100.

Then, in step STc16, the command response processing unit 68 reports the completion status to the host device 100 via HDC 50. The processing executed by the magnetic disk device 1 is thereby ended.

Figure 15:
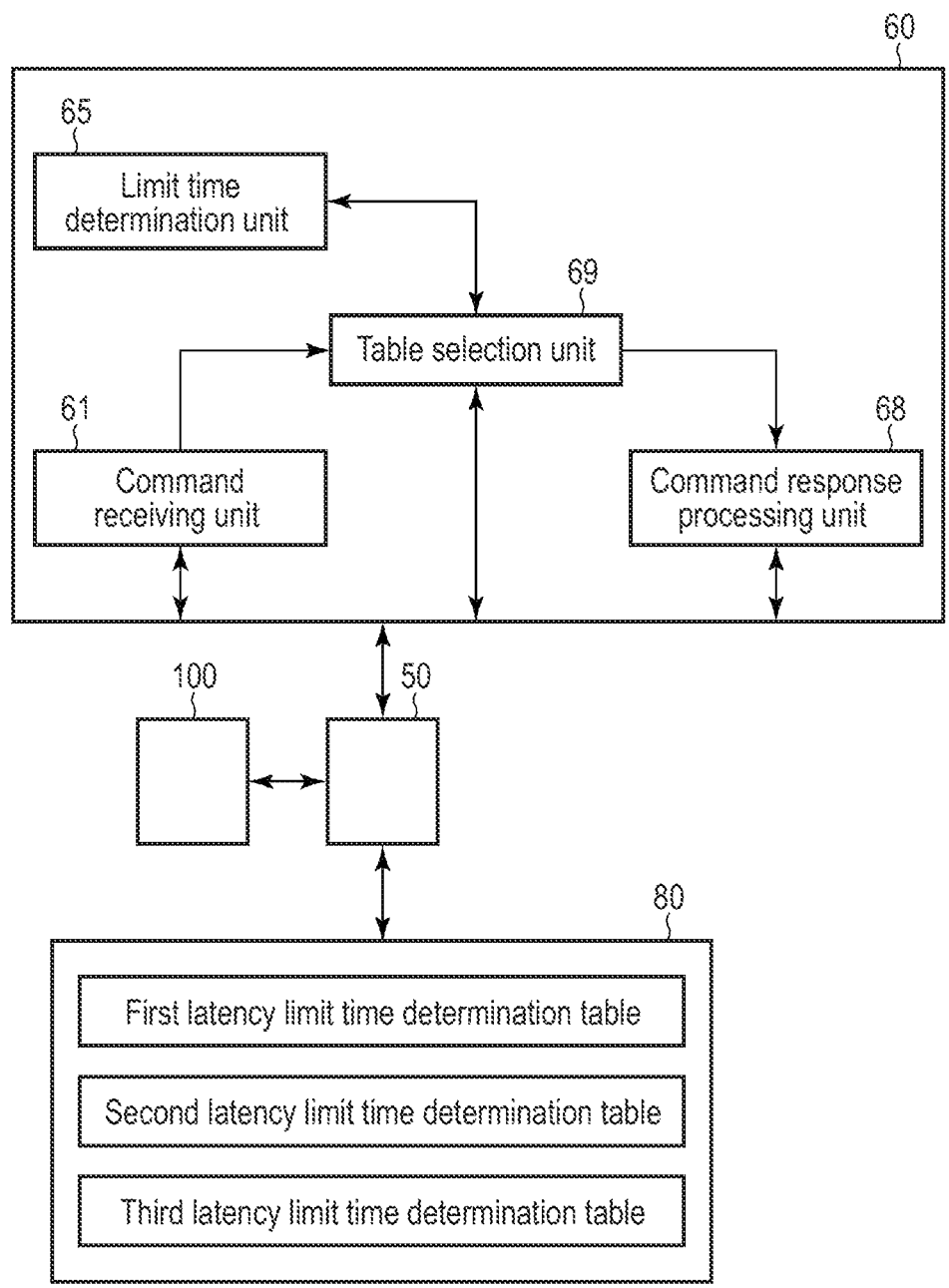
FIG. 15 is a block diagram showing the HDC, the MPU, a nonvolatile memory, and the host device of the embodiment.

Next, the configuration of the magnetic disk device 1 for switching the latency limit time determination table to be used will be described. FIG. 15 is a block diagram showing the HDC 50, the MPU the nonvolatile memory 80 of the embodiment, and the host device 100. In FIG. 15, not all constituent elements of the MPU 60 are shown and only constituent elements necessary for the descriptions are illustrated.

As shown in FIG. 15, the MPU 60 further comprises a table selection unit 69. The table selection unit 69 can select one latency limit time determination table from a plurality of latency limit time determination tables stored in the nonvolatile memory 80. The limit time determination unit 65 can obtain the latency limit time corresponding to the number of commands and the R/W ratio from among the plurality of latency limit times in the latency limit time determination table selected by the table selection unit 69.

Figure 16:
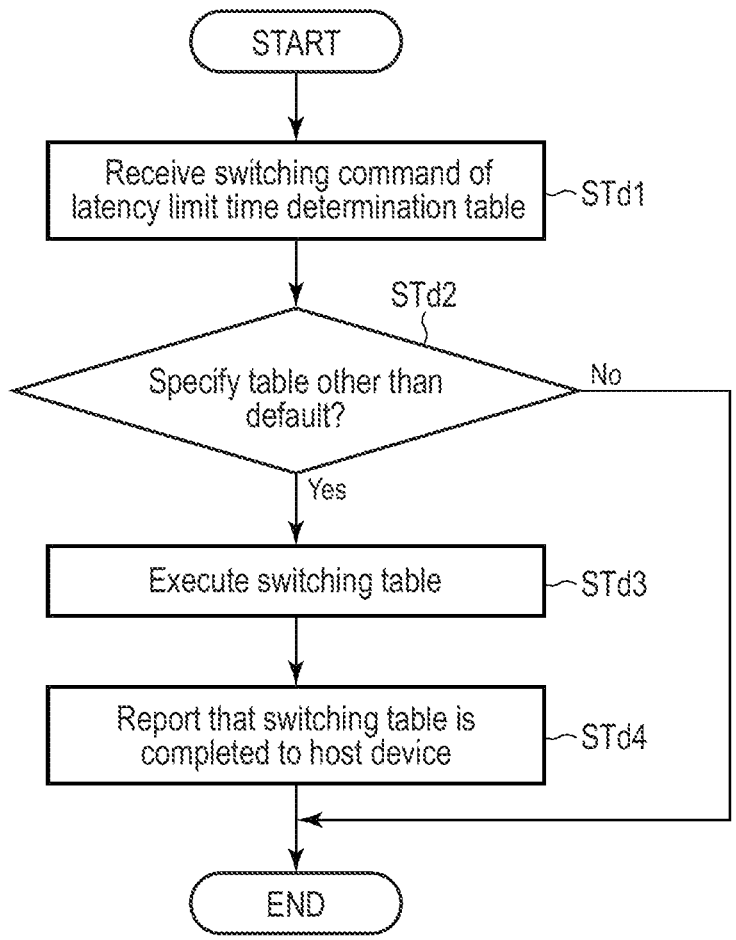
FIG. 16 is a flowchart showing a flow of switching the latency limit time determination table to be used, in the magnetic disk device of the embodiment.

Next, the method of switching the latency limit time determination table to be used will be described. FIG. 16 is a flowchart showing a flow of switching the latency limit time determination table to be used, in the magnetic disk device 1 of the embodiment.

As shown in FIG. 16 and FIG. 15, when the method of switching the latency limit time determination table is started, the table selection unit 69 first receives a latency limit time determination table switching command via the command receiving unit 61 in step STd1. The host 100 issues the switching command by, for example, user operations.

Then, in step STd2, the table selection unit 69 determines whether a latency limit time determination table other than the default is specified. For example, if the limit time determination unit 65 uses the first latency limit time determination table, in a default status, the table selection unit 69 determines whether the second or third latency limit time determination table is specified.

If the latency limit time determination table other than the default is not specified (step STd2), the switching method is ended.

In contrast, if the latency limit time determination table other than the default is specified (step STd2), then the flow shifts to step STd3 and the table selection unit 69 executes switching of the latency limit time determination table. For example, if the host device 100 specifies the second latency limit time determination table, the table selection unit 69 can switch the latency limit time determination table used by the limit time determination unit 65 from the first latency limit time determination table to the second latency limit time determination table.

After that, in step STd4, the command response processing unit 68 reports to the host device 100 via HDC 50 that the switching of the latency limit time determination table is completed. The switching method is thereby ended.

According to the magnetic disk device 1 and the command processing method of the embodiment configured as described above, a command to be executed can be selected by considering the corresponding latency limit time in the latency limit time determination table. For this reason, the magnetic disk device 1 and the command processing method capable of efficiently executing commands while considering the response time can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the latency limit time determination tables used by the magnetic disk device 1 are not limited to the above-described first to third latency limit time determination tables, but can be variously modified. The magnetic disk device 1 may use at least one type of latency limit time determination table. The types of latency limit time determination tables included in the magnetic disk device 1 are not limited to three types, but may be one, two, or four or more types.

What is claimed is:

1. A magnetic disk device comprising:
   a disk;
   a head writing data to the disk and reading data from the disk;
   a command queue temporarily storing one or more commands received;
   a command residence time calculation unit calculating a residence time of each of the commands in the command queue;
   a command information calculation unit calculating the number of the commands in the command queue, and a ratio of read commands to write commands in the command queue;
   a limit time determination unit obtaining a latency limit time corresponding to the number of commands and the ratio, from among a plurality of latency limit times in a latency limit time determination table; and
   a command selection processing unit selecting a command to be executed, by considering the latency limit time obtained by the limit time determination unit.

2. The magnetic disk device of claim 1, wherein
   the plurality of latency limit times in the latency limit time determination table are set individually according to the number of commands and the ratio.

3. The magnetic disk device of claim 1, wherein
   when determining that an unexecuted first exceeding command that exceeds the latency limit time remains in the command queue, the command selection processing unit selects the first exceeding command as a command to be next executed.

4. The magnetic disk device of claim 1, further comprising:
   an aging time determination unit determining whether an unexecuted second exceeding command that exceeds the aging time remains in the command queue,
   wherein
   the command selection processing unit selects a command to be executed by considering the latency limit time when determining that the second exceeding command does not remain in the command queue, or selects the second exceeding command as a command to be next executed without considering the latency limit time when determining that the second exceeding command remains in the command queue,
   the aging time is applied uniformly to all commands in all queues stored in the command queue, and
   each of the plurality of latency limit times of the latency limit time determination table is shorter than the aging time.

5. The magnetic disk device of claim 1, further comprising:
   a table selection unit capable of selecting one of the plurality of latency limit time determination tables including the latency limit time determination table,
   wherein
   the limit time determination unit obtains a latency limit time corresponding to the number of commands and the ratio from among the plurality of latency limit times in the latency limit time determination table selected by the table selection unit.

6. The magnetic disk device of claim 1, wherein
   the plurality of latency limit times in the latency limit time determination table are set to be longer as the number of commands increases when the ratio is fixed.

7. The magnetic disk device of claim 1, wherein
   the plurality of latency limit times in the latency limit time determination table are set to be longer as the ratio is closer to a range of 90 to 99% when the number of commands is fixed.

8. The magnetic disk device of claim 1, further comprising:
- a cache buffer temporarily storing the one or more commands instead of the command queue,
- wherein
- when determining that an unexecuted first exceeding command that exceeds the latency limit time does not remain in the command queue, the command selection processing unit selects a shortest command that can be executed in a shortest time from the plurality of commands included in the command queue and the cache buffer, as a command to be next executed.

9. A command processing method applied to a magnetic disk device comprising a disk, a head writing data to the disk and reading data from the disk, and a command queue temporarily storing one or more commands received, the method comprising:
- calculating a residence time of each of the commands in the command queue;
- calculating the number of the commands in the command queue, and a ratio of read commands to write commands in the command queue;
- obtaining a latency limit time corresponding to the number of commands and the ratio, from among a plurality of latency limit times in a latency limit time determination table; and
- selecting a command to be executed, by considering the obtained latency limit time.

10. The command processing method of claim 9, wherein the first exceeding command is selected as a command to be next executed when determining that an unexecuted first exceeding command that exceeds the latency limit time remains in the command queue in a case of selecting a command to be executed by considering the obtained latency limit time.

11. The command processing method of claim 9, further comprising:
- determining whether an unexecuted second exceeding command that exceeds the aging time remains in the command queue, before calculating the residence time; and
- selecting a command to be executed by considering the latency limit time when determining that the second exceeding command does not remain in the command queue, or selecting the second exceeding command as a command to be next executed without considering the latency limit time when determining that the second exceeding command remains in the command queue,
- wherein
- the aging time is applied uniformly to all commands in all queues stored in the command queue, and
- each of the plurality of latency limit times of the latency limit time determination table is shorter than the aging time.

* * * * *